3,248,430
NOVEL ETHERS AND PROCESS FOR
PRODUCING SAME
Walter Kimel, Highland Park, N.J., assignor to Hoffmann-
La Roche Inc., Nutley, N.J., a corporation of New
Jersey
No Drawing. Filed Mar. 22, 1962, Ser. No. 181,820
13 Claims. (Cl. 260—615)

This invention relates, in general, to novel ethers and to a process for producing same. More particularly, the invention relates to ethers both of 3,7-dihydroxy-3,7-dimethyl-1-octyne and certain of its homologs, to ethers both of 3,7-dihydroxy-3,7-dimethyl-1-octen and certain of its homologs and to processes for the production of such ethers.

The novel compounds of this invention are selected from the group consisting of ethers having the formula:

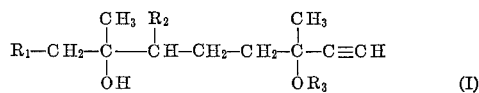

(I)

and ethers having the formula:

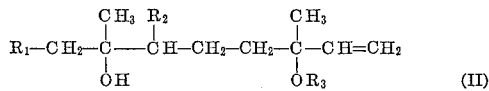

(II)

wherein, in each of Formulas I and II, $R_1$ represents hydrogen or a lower alkyl group, preferably, an alkyl group having from 1 to 3 carbon atoms; $R_2$ represents hydrogen or a lower alkyl group, preferably, an alkyl group having from 1 to 3 carbon atoms; and $R_3$ represents a lower alkyl group, preferably, an alkyl group having from 1 to 3 carbon atoms. Two or all three of the alkyl groups represented by the symbols $R_1$, $R_2$ and $R_3$ can be the same group or all three groups can be different.

The hydroxy ethers of both Formula I and Formula II have been found to be extremely useful as odorants in the art of perfumery. Because of their fine fragrance they can be employed as odorants in the preparation of perfumes and in the preparation of other scented compositions. The manner in which the compounds are used for such purposes will be readily apparent to those skilled in the art.

In the practice of this invention the hydroxy ethers of Formula I are obtained by hydrating either an ether, of 3,7-dimethyl-3-hydroxy-6-octen-1-yne, or an ether of a homolog thereof. More specifically, the products of this invention are prepared by the hydration of a compound having the formula.

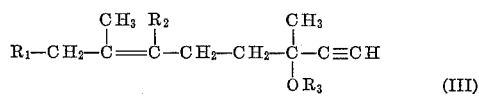

(III)

wherein $R_1$, $R_2$ and $R_3$ have the same meanings as in Formulas I and II. The hydroxy ethers of Formula II are obained by hydrogenating the ethers of Formula I.

Thus, in its most comprehensive embodiment, the present invention is concerned with the hydroxy ethers of Formula I and with the hydroxy ethers of Formula II. In a more particular embodiment, the invention is concerned with methods for producing such compounds.

In the production of the compounds of Formula I, an ether of Formula III is hydrated by reacting it with a mixture comprising water, sulfuric acid and acetic acid. It has been found that the use of a sulfuric acid-acetic acid mixutre is essential to the success of the reaction. Where acetic acid is eliminated from the reaction mixture, the desired ether is not obained. Where the use of sulfuric acid is dispensed with, no reaction occurs. Additionally, it has been established that the ratio of the starting ether, sulfuric acid, acetic acid and water present in the reaction mixture is to some extent critical.

The reaction system should contain a ratio of from about 1.0 to about 3.0 parts by weight of sulfuric acid, from about 2.0 to about 6.0 parts by weight of acetic acid and from about 2.0 to about 6.0 parts by weight of water for each part by weight of the starting ether present therein. In the preferred embodiment of the invention, about 2.0 parts by weight of sulfuric acid, about 4.0 parts by weight of acetic acid and about 4.0 parts by weight of water are used for each part by weight of starting ether. In general, the reaction can be carried out by heating the reaction system at a temperature within the range of from about 20° C. to 100° C. Preferably, however, a temperature within the range of from about 40° C. to 50° C. is utilized. The reaction can be carried out at temperatures below about 40° C. However, the use of such lower temperatures will serve to prolong the time required to convert the starting ether to the desired hydroxy ether. On the other hand, when the reaction is carried out at temperatures above about 50° C., for example, a temperature of from 50° C. to 100° C., an increasing tendency toward the formation of undesired side products will be noted. However, temperatures above about 50° C. can be used advantageously where the reaction system is provided with a minimum quantity of sulfuric acid, that is, when the reaction mixture contains less than about 2.0 parts by weight of sulfuric acid for each 1.0 part by weight of starting ether.

The reaction time will be variable within rather wide limits. Generally, however, when temperatures within the range of from 40° C. to 50° C. are used, conversion of the ether of Formla III to the corresponding hydroxy ether of Formula I will be accomplished in a period of from about 3 to about 8 hours. When the reaction is complete, the reaction mixture is diluted with water to at least about one and one-half times its original volume. A greater quantity of water can be added to the mixture, if desired. The solution is thereafter extracted with an inert, water-immiscible organic solvent in which the reaction product is soluble. Solvents, such as ether, benzene, toluene, etc., are especially well suited for use. After its extraction, the aqueous layer is separated from the solvent layer and the latter is washed with a base, for example, sodium bicarbonate, and then with water until it is neutral in reaction. After drying over calcium sulfate, the solvent solution is distilled, at diminished pressure, to obtain the desired hydroxy ether of Formula I.

The conversion of the hydroxy ethers of Formula I into the hydroxy ethers of Formula II can be readily accomplished. The hydroxy ether of Formula I is first dissolved in some suitable inert, water-immiscible organic solvent. Hexane has been found to be well suited for use although it should be understood that other solvents, such as ether, benzene, toluene, etc., can be employed, if desired. The quantity of solvent used is not critical, the present purposes being served if the amount of solvent employed is sufficient to completely dissolve the ether at room temperature. Thereafter, the hydroxy ether of Formula I is reacted with an equimolar quantity of hydrogen, at room temperature and atomspheric pressure, in the presence of any known hydrogenation catalyst, as, for example, platinum oxide, palladium, Raney nickel, etc. Preferably, however, catalysts, such as are described by Lindlar in Helvetica Chimica Acta 35, 446 (1952), are used, since these have a preferential tendency to catalyze the reduction of acetylenic bonds only so far as olefinic bonds. A preferred catalyst for use in practicing the process of this invention is a palladium-on-calcium carbonate catalyst, upon which metallic lead has been deposited. This catalyst is specifically disclosed by Lindlar at page 450 of the cited publication. When hydrogenation is complete, the hydroxy ether of Formula II is recovered by distillation.

For a fuller understanding of the nature and objects of this invention, reference may be had to the following examples which are given merely as further illustrations of the invention and are not to be considered in a limiting sense. All parts given in the examples are parts by weight unless otherwise indicated.

Example 1

In this example, 200.0 grams of 3,7-dimethyl-3-methoxy-6-octen-1-yne (Formula III: $R_1=R_2=H$; $R_3=CH_3$) were added to a mixture of 400 grams of sulfuric acid (98%), 800 cc. of acetic acid and 800 cc. of water. The mixture was warmed to, and maintained for a period of about 3 hours at, a temperature within the range of from about 450° C. to 50° C. Thereafter, the mixture was diluted with 2.0 liters of water, and then extracted with ether. The ether layer was next washed with sodium bicarbonate and then with water until neutral in reaction. The solution was dried over calcium sulfate and distilled at diminished pressure. There was obtained 3,7-dimethyl-3-methoxy-1-octyn-7-ol (Formula I:

$$R_1=R_2=H$$

$R_3=CH_3$), having a boiling point of 104° C. to 106° C. (6 mm.); $n_D^{25}$ 1.4518; $d_4^{25}$ 0.919.

Example 2

A mixture of 100.0 grams of 3,7-dimethyl-3-methoxy-6-octen-1-yne, 100.0 grams of concentrated sulfuric acid (98%), 400 cc. of acetic acid, and 400 cc. of water was heated to, and maintained for a period of about 3 hours at, a temperature of 60° C. to 65° C., with vigorous stirring. The reaction mixture was allowed to stand overnight, following which it was diluted with about 2.0 liters of water. The mixture was then extracted with ether and it was washed first with sodium bicarbonate and then with water until neutral in reaction.

Vacuum distillation yielded 3,7-dimethyl-3-methoxy-1-octyn-7-ol, having a boiling point of 106° C. to 108° C. (8 mm.); $n_D^{25}$ 1.4519.

Example 3

3,7-dimethyl-3-methoxy-1-octyn-7-ol produced by the method described in Example 1, was converted by hydrogenation into 3,7-dimethyl-3-methoxy-1-octen-7-ol (Formula II: $R_1=R_2=H$; $R_3=CH_3$). The procedure employed was as follows: A solution was prepared by dissolving 388.4 grams of 3,7-dimethyl-3-methoxy-1-octyn-7-ol in 400.0 grams of hexane. To this solution, 11.6 grams of Lindlar catalyst [5% palladium-on-calcium carbonate, modified by deposition of lead thereon, as specifically disclosed by Lindlar, Helvetica Chimica Acta 35, 450, (1952)] were added. The ether was then reacted with an equimolar quantity of hydrogen at room temperature and atmospheric pressure. Approximately, 95% of the theoretical amount of hydrogen had been consumed when uptake ceased. The reaction mixture was, thereafter, distilled and 3,7-dimethyl-3-methoxy-1-octen-7-ol, having a boiling point at 78° C. (0.5 mm.); $n_D^{25}$ 1.4509, was obtained in quantitative yield.

Example 4

In this example, a mixture of 169 grams of 3-methoxy-3,6,7-trimethyl-6-octen-1-yne (Formula III: $R_1=H$; $R_2=R_3=CH_3$), 338 grams of sulfuric acid (98%), 676 grams of acetic acid and 676 grams of water was stirred vigorously at a temperature of from about 45° C. to 50° C. for a period of about six hours. The mixture was thereafter diluted with about 3.0 liters of water, following which it was extracted with ether. The ether layer was washed with sodium bicarbonate and water until neutral in reaction. The ether solution was subsequently subjected to fractional distillation. After recovery of some unreacted starting material at 82° C. to 84° C. (7–8 mm.), there was obtained 3-methoxy-3,6,7-trimethyl-1-octyn-7-ol, boiling point at 113° C. to 116° C. (7.5 mm.); $n_D^{25}$ 1.4573.

Example 5

In this example, a mixture of 159.7 grams of 3,7-dimethyl-3-methoxy-6-nonen-1-yne (Formula III:

$$R_1=R_3=CH_3$$

$R_2=H$), 319.4 grams of sulfuric acid (98%), 639 cc. of acetic acid and 639 cc. of water was heated at a temperature of about 50° C. for about 6 hours. The reaction mixture was continuously and vigorously stirred during the heating step. Thereafter, the reaction was allowed to continue overnight at room temperature with continuous stirring. The reaction mixture was then diluted with 3.5 liters of water, extracted with ether and worked up in the manner described in Example 1. 3,7-dimethyl-3-methoxy-1-nonyn-7-ol (Formula I:

$$R_1=R_3=CH_3$$

$R_2=H$) was obtained at boiling point 114° C. to 116° C. (7 mm.); $n_D^{25}$ 1.4550.

Example 6

In this example, 23.0 grams of the ether produced in Example 5, that is, 3,7-dimethyl-3-methoxy-1-nonyn-7-ol (Formula I: $R_1=R_3=CH_3$; $R_2=H$) were dissolved in 46 cc. of hexane. To this solution, 1.2 grams of Lindlar catalyst (same catalyst as described in Example 3) was added. The ether was then reacted with an equimolar quantity of hydrogen at room temperature and atmospheric pressure. The consumption of 99% of the hydrogen theoretically required was noted. By distillation, 3,7-dimethyl-3-methoxy-1-nonen-7-ol, boiling point 127° C. to 129° C. (14 mm.); $n_D^{25}$ 1.4541, was isolated in quantitative yield.

Example 7

In this example, 101.5 grams of 3,7-dimethyl-3-ethoxy-6-nonen-1-yne (Formula III: $R_1=CH_3$; $R_2=H$; $R_3=C_2H_5$)

were added to a mixture of 406 cc. of acetic acid and 609 grams of a 33% aqueous solution of sulfuric acid (98%). The reaction mixture was stirred for a period of about 8 hours at a temperature of from about 45° C. to 50° C. Thereafter, the reaction mixture was diluted with 2200 cc. of water, and worked up in the manner described in Example 1. After isolation of the unreacted starting material by distillation, there was obtained 3,7-dimethyl-3-ethoxy-1-nonyn-7-ol, boiling point 125° C. to 126° C. (10 mm.); $n_D^{25}$ 1.4530.

Example 8

3,7-dimethyl-3-ethoxy-1-nonen-7-ol was obtained by hydrogenating the ether produced in Example 7. The hydrogenation was carried out in the following manner: 9.7 grams of 3,7-dimethyl-3-ethoxy-1-nonyn-7-ol were dissolved in 33 cc. of hexane. It was hydrogenated with one mole of hydrogen, at room temperature and atmospheric pressure, in the presence of 1.6 grams of the Lindlar catalyst described in Example 3. The reaction mixture was subsequently subjected to vacuum distillation to yield 14.7 grams of 3,7-dimethyl-3-ethoxy-1-nonen-7-ol, boiling point 117° C. (8 mm.); $n_D^{25}$ 1.4517.

I claim:

1. As a new class of compounds, members selected from the group consisting of ethers having the formula

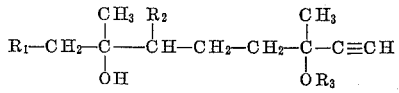

and ethers having the formula

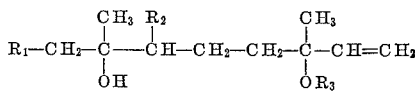

wherein, in each of said formulas, $R_1$ represents a member selected from the group consisting of hydrogen and a lower alkyl group, $R_2$ represents a member selected from the group consisting of hydrogen and a lower alkyl group and $R_3$ represents a lower alkyl group.

2. As a new class of compounds, ethers having the formula

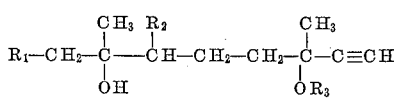

wherein $R_1$ represents a member selected from the group consisting of hydrogen and a lower alkyl group, $R_2$ represents a member selected from the group consisting of hydrogen and a lower alkyl group and $R_3$ represents a lower alkyl group.

3. The product according to claim 2 wherein $R_1$ and $R_2$ represent hydrogen atoms and wherein $R_3$ represents a methyl group.

4. The product according to claim 2 wherein $R_1$ represents a hydrogen atom and $R_2$ represents a methyl group and wherein $R_3$ represents a methyl group.

5. The product according to claim 2 wherein $R_1$ represents a methyl group and $R_2$ represents a hydrogen atom and wherein $R_3$ represents a methyl group.

6. The product according to claim 2 wherein $R_1$ represents a methyl group and $R_2$ represents a hydrogen atom and wherein $R_3$ represents an ethyl group.

7. As a new class of compounds, ethers having the formula

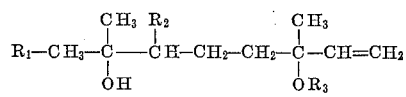

wherein $R_1$ represents a member selected from the group consisting of hydrogen and a lower alkyl group, $R_2$ represents a member selected from the group consisting of hydrogen and a lower alkyl group and $R_3$ represents a lower alkyl group.

8. A process which comprises mixing an ether having the formula

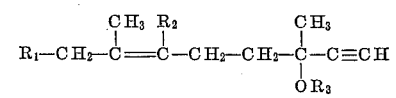

wherein $R_1$ represents a member selected from the group consisting of hydrogen and a lower alkyl group, $R_2$ represents a member selected from the group consisting of hydrogen and a lower alkyl group and wherein $R_3$ represents a lower alkyl group
with a mixture comprising sulfuric acid, acetic acid and water at a temperature of from about 20° C. to about 100° C., said mixture containing from about 1 to about 3 parts by weight of sulfuric acid, from about 2.0 to about 6.0 parts by weight of acetic acid and from about 2.0 to about 6.0 parts by weight of water for each part by weight of said ether in the reaction system.

9. A process which comprises mixing an ether having the formula

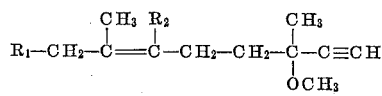

wherein $R_1$ represents a member selected from the group consisting of hydrogen and a lower alkyl group and $R_2$ represents a member selected from the group consisting of hydrogen and a lower alkyl group
with a mixture comprising sulfuric acid, acetic acid and water at a temperature of from about 20° C. to 100° C., said mixture containing from about 1 to about 3 parts by weight of sulfuric acid, about 4 parts by weight of acetic acid and about 4 parts by weight of water for each part by weight of ether in the reaction system.

10. A process which comprises mixing an ether having the formula

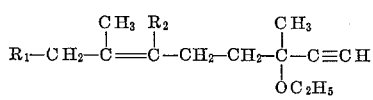

wherein $R_1$ represents a member selected from the group consisting of hydrogen and a lower alkyl group and $R_2$ represents a member selected from the group consisting of hydrogen and a lower alkyl group
with a mixture comprising sulfuric acid, acetic acid and water at a temperature of from about 20° C. to about 100° C., said mixture containing from about 1 to about 3 parts by weight of sulfuric acid, about 4 parts by weight of acetic acid and about 4 parts by weight of water for each part by weight of ether in the reaction system.

11. A process which comprises mixing an ether having the formula

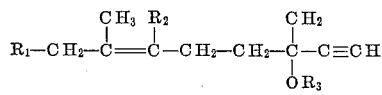

wherein $R_1$ represents a member selected from the group consisting of hydrogen and a lower alkyl group, $R_2$ represents a member selected from the group consisting of hydrogen and a lower alkyl group and wherein $R_3$ represents a lower alkyl group
with a mixture comprising sulfuric acid, acetic acid and water at a temperature of from about 20° C. to about 100° C., said mixture containing from about 1 to about 3 parts by weight of sulfuric acid, from about 2.0 to about 6.0 parts by weight of acetic acid and from about 2.0 to about 6.0 parts by weight of water for each part by weight of said ether in the reaction system, separating from said system the hydroxy ether thus produced, and hydrogenating the acetylenic bond of said hydroxy ether by reacting said hydroxy ether with hydrogen in the presence of a catalyst.

12. The process of claim 11 wherein the starting ether employed has the formula

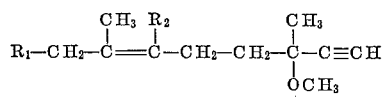

wherein $R_1$ represents a member selected from the group consisting of hydrogen and a lower alkyl group and $R_2$ represents a member selected from the group consisting of hydrogen and a lower alkyl group.

13. The process of claim 11 wherein the starting ether employed has the formula

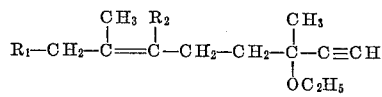

wherein $R_1$ represents a member selected from the group consisting of hydrogen and a lower alkyl group and $R_2$ represents a member selected from the group consisting of hydrogen and a lower alkyl group.

References Cited by the Examiner

UNITED STATES PATENTS 2,281,620  7/1958  Colaianni et el. ____ 260—614 X

OTHER REFERENCES

Kenneth et al., Jour. Amer. Chem. Soc., Vol. 60 (1938), pages 718–720.

Newman, Jour. Amer. Chem. Soc., Vol. 75 (1953), pages 4740—4742.

LEON ZITVER, *Primary Examiner.*